United States Patent
Kamei et al.

(10) Patent No.: US 8,079,758 B2
(45) Date of Patent: Dec. 20, 2011

(54) TEMPERATURE COMPUTING INSTRUMENT AND METHOD FOR CALIBRATING TEMPERATURE OF SENSOR PART USED THEREFOR

(75) Inventors: Kenji Kamei, Kyoto (JP); Seiji Tsutsui, Kyoto (JP)

(73) Assignee: Sebacs Co., Ltd. (JP)

( * ) Notice: Subject to any disclaimer, the term of this patent is extended or adjusted under 35 U.S.C. 154(b) by 670 days.

(21) Appl. No.: 12/257,703

(22) Filed: Oct. 24, 2008

(65) Prior Publication Data

US 2009/0110024 A1    Apr. 30, 2009

(30) Foreign Application Priority Data

Oct. 25, 2007  (JP) .................................. 2007-277052
Oct. 3, 2008   (JP) .................................. 2008-258337

(51) Int. Cl.
  *G01K 7/00*    (2006.01)
  *G01K 15/00*   (2006.01)
(52) U.S. Cl. ............. 374/183; 374/3; 374/163; 374/170
(58) Field of Classification Search ................ 374/1, 3, 374/117, 141, 163, 170, 183–185
See application file for complete search history.

(56) References Cited

U.S. PATENT DOCUMENTS

| 6,190,040 | B1 | 2/2001 | Renken et al. | |
| 6,709,878 | B2* | 3/2004 | Akram et al. | 438/14 |
| 6,889,568 | B2 | 5/2005 | Renken | |
| 6,908,224 | B2* | 6/2005 | Schneider et al. | 374/1 |
| 6,915,589 | B2 | 7/2005 | Sun et al. | |
| 7,135,852 | B2 | 11/2006 | Renken et al. | |
| 7,193,498 | B2* | 3/2007 | Kawamoto et al. | 338/22 R |
| 2004/0086026 | A1* | 5/2004 | Miki et al. | 374/183 |
| 2008/0144695 | A1 | 6/2008 | Hamada | |

FOREIGN PATENT DOCUMENTS

JP     2002-544502     12/2002
JP     2008-140833     6/2008

* cited by examiner

*Primary Examiner* — Amy Johnson
(74) *Attorney, Agent, or Firm* — Ostrolenk Faber LLP (57) ABSTRACT

A sensor part is provided with a printed circuit board that is made of resin and formed with a pair of electrically conductive metal patterns. Each of the pair of electrically conductive metal patterns includes: a first pattern part connected to a pair of electrodes of a temperature sensor; a second pattern part connected to a pair of conductive wires; and a connection part making a connection between the first and second pattern parts. The connection between the pair of electrodes of the temperature sensor and the first pattern part or between the pair of conductive wires and the second pattern part is made with the use of Dotite or solder.

7 Claims, 7 Drawing Sheets

TEMPERATURE COMPUTING INSTRUMENT AND METHOD FOR CALIBRATING TEMPERATURE OF SENSOR PART USED THEREFOR

BACKGROUND OF THE INVENTION

1. Field of the Invention

The present invention relates to a temperature computing instrument used for measuring performance of substrate treatment equipment, and a method for configuring a sensor part used for the temperature computing instrument.

2. Description of the Background Art

In thermal treatment equipment for thermally treating a substrate such as a semiconductor wafer, a glass substrate for a liquid crystal display panel, or a mask substrate for a semiconductor manufacturing apparatus, the substrate is placed on a thermal treatment plate such as a hot plate or a cool plate to perform the thermal treatment. In such a case, a temperature of the substrate to be thermally treated should be measured. Such temperature measurement of the substrate in treatment may be needed not only for the thermal treatment equipment but also for a coater for coating photoresist, or developer for development processing of photoresist.

Meanwhile, when such substrate temperature measurement is performed, it is difficult to measure a temperature of the substrate that is being actually subjected to treatment. For this reason, the temperature of the substrate is typically adapted to be measured by: embedding in a temperature measuring substrate a temperature sensor using a temperature sensing member such as a platinum resistor or thermocouple, or utilizing a resonant frequency of a quartz oscillator; setting the temperature measuring substrate in a treatment part of the substrate treatment equipment such as thermal treatment equipment; and measuring a temperature of the temperature measuring substrate (for example, Japanese Unexamined Patent Publication No. 2008-140833).

The above patent document describes a temperature measuring substrate configured such that a plurality of temperature sensors are fixed with an adhesive to a substrate; the sensors are respectively connected with conductive wires; and the respective conductive wires are bonded to the substrate.

Upon bonding of the conductive wires and terminals of the temperature sensors as described above, if thick conductive wires are used for the bonding parts in order to achieve mechanical strength, heat is radiated through the conductive wires, and therefore a temperature measurement error arises. Also, if bonding states of the bonding parts are not uniform, a temperature measurement error also arises.

SUMMARY OF THE INVENTION

It is therefore an object of the present invention to provide a temperature computing instrument that has a simple configuration and yet can accurately measure a temperature of a temperature measuring substrate.

The above-described object of the present invention is accomplished by a temperature computing instrument like one for measuring performance of substrate treatment equipment, the temperature computing instrument including: a temperature measuring substrate to be placed in a treatment part of the substrate treatment equipment; a temperature sensor fixed to the substrate; a printed circuit board made of resin, the printed circuit board being formed with a pair of electrically conductive metal patterns connected to an electrode of the temperature sensor; a pair of conductive wires connected to the pair of electrically conductive metal patterns; and a temperature computing part connected to the pair of conductive wires.

According to such temperature computing instrument, a temperature of the substrate can be accurately measured in spite of a simple configuration.

In one preferred embodiment, the pair of electrically conductive metal patterns includes: a first pattern part connected to a pair of electrodes of the temperature sensor; a second pattern part connected to the pair of conductive wires; and a connection part making a connection between the first pattern part and the second pattern part, the connection part having a large thermal resistance.

If such configuration is employed, an action of the connection part having a large thermal resistance enables heat transfer between the sensor and the conductive wires to be decreased, and influence of heat radiation by the conductive wires to be minimized.

Also, from another perspective, the present invention is a temperature calibration method for calibrating a temperature sensor used for a temperature computing instrument for measuring performance of substrate treatment equipment, the method including: a connection step of connecting all temperature sensors to be fixed to a temperature measuring substrate to be placed in a treatment part of the substrate treatment equipment and pairs of conductive wires corresponding to the temperature sensors to a printed circuit board made of resin, the printed circuit board being formed with an electrically conductive metal pattern; a measurement step of immersing the printed circuit board along with the temperature sensors and the conductive wires in temperature-controlled liquid to measure output signals of the temperature sensors, the temperature sensors and the conductive wires being connected to the printed circuit board, the measurement step being performed multiple times with a temperature of the liquid being changed; and a calibration step of, on a basis of the temperature of the liquid in the measurement step and the output signals of the temperature sensors at the temperature, performing temperature calibration of the sensors.

In this case, preferably, the printed circuit board made of resin is extremely thin and bendable, and in the measurement step, the plurality of temperature sensors are put into an oil bath with being shaped small by bending the printed circuit board.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
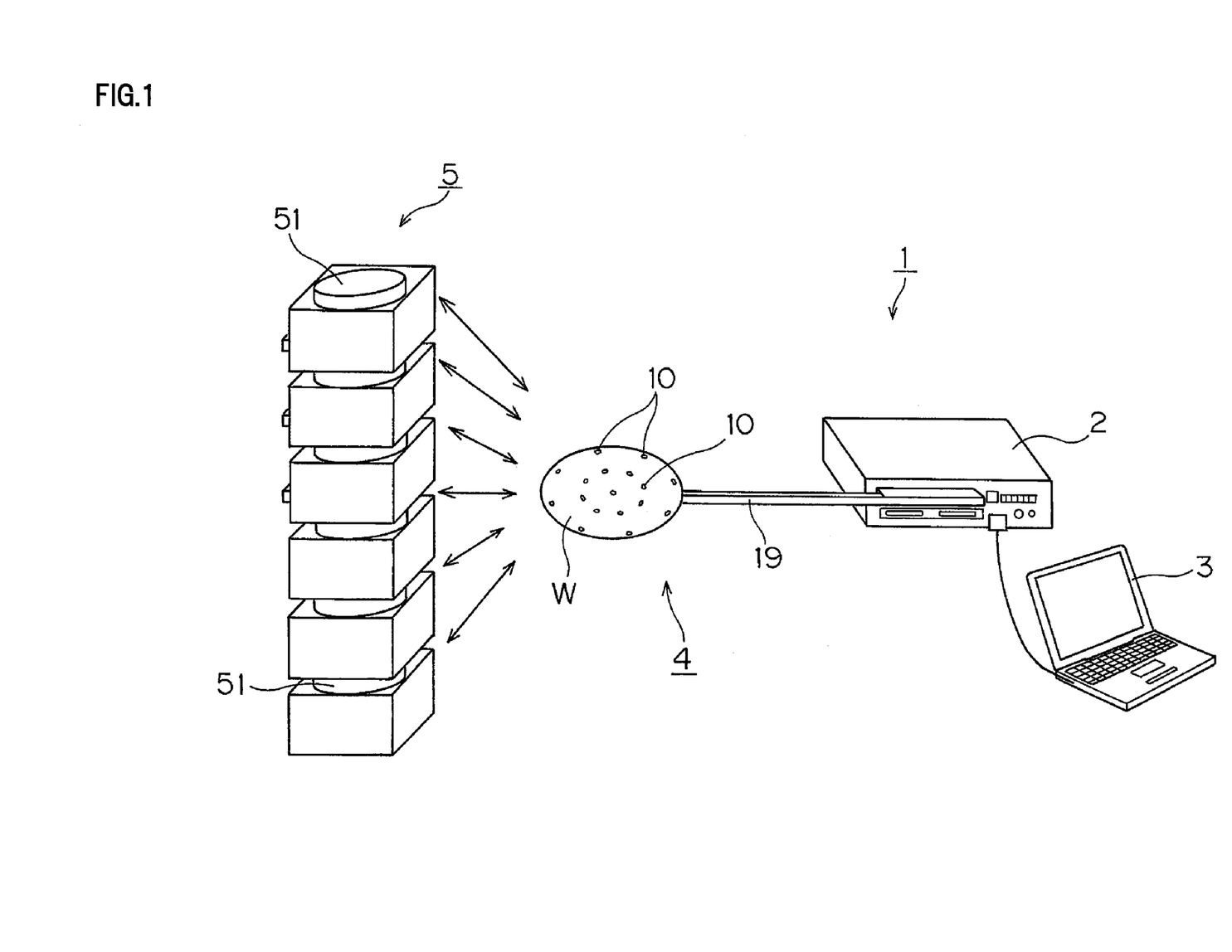
FIG. 1 is a schematic diagram of a temperature computing instrument according to the present invention.

Embodiments of the present invention will hereinafter be described referring to the drawings. FIG. 1 is a schematic diagram of a temperature computing instrument according to the present invention.

The temperature computing instrument is intended for measuring performance of thermal treatment equipment 5 having a thermal treatment plate 51, and provided with: a temperature measuring part 4 measuring a temperature of a temperature measuring substrate W; a temperature computing part 2 computing the temperature on a basis of a measured value by the temperature measuring part 4; and a personal computer 3 functioning as an input/output part and display part.

Figure 2:
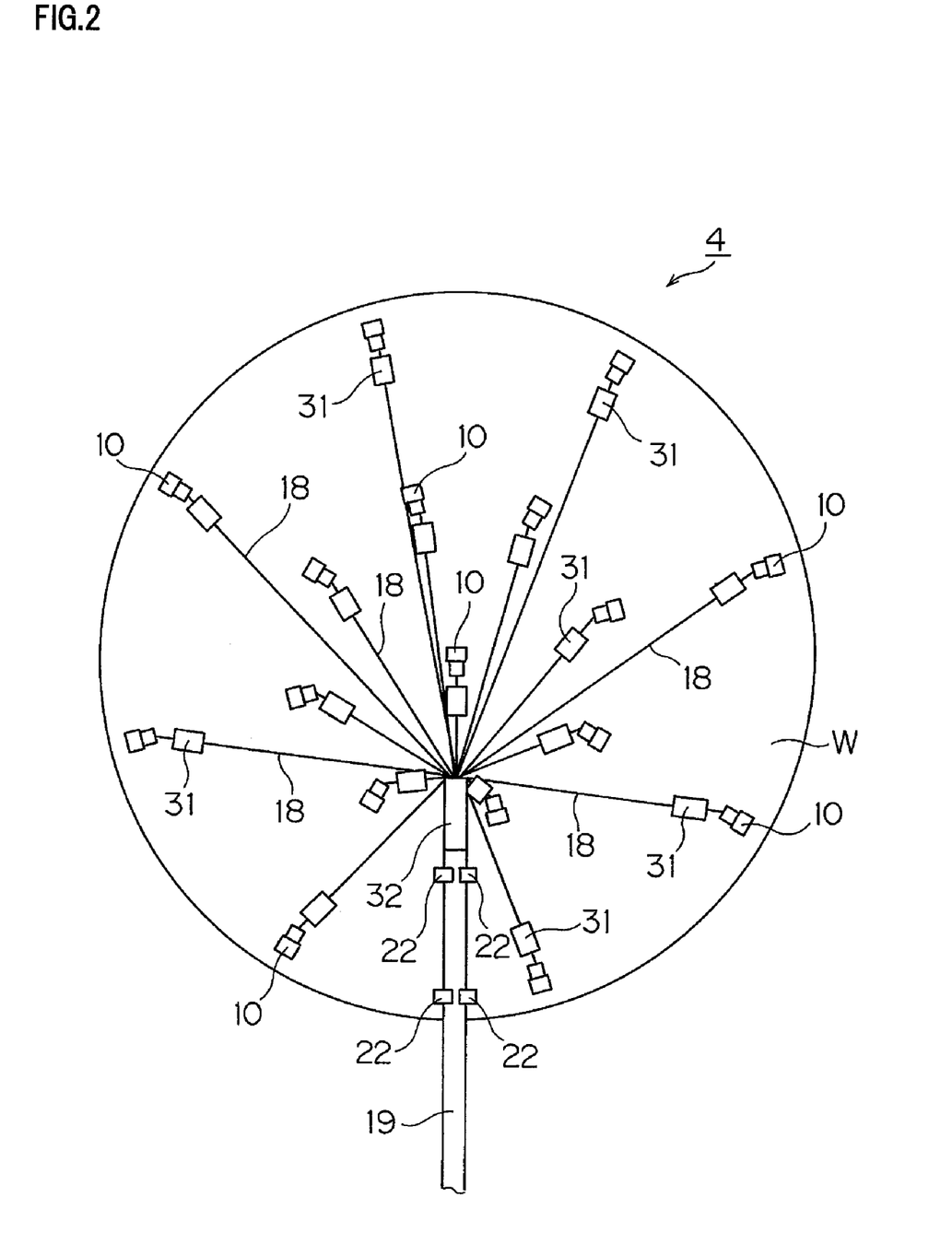
FIG. 2 is a plan view of a temperature measuring part.

FIG. 2 is a plan view of the temperature measuring part 4.

The temperature measuring part 4 is intended for measuring the performance of the thermal treatment equipment 5 with the use of the temperature measuring substrate W, and provided with: seventeen sensor parts 10 fixed to the temperature measuring substrate W; conductive wires 18 connected to the sensor parts 10; cable clamps 31 and 32 for fixing the conductive wires 18 to the temperature measuring substrate W; and clamps 22 for fixing to the temperature measuring substrate W a cable 19 into which the seventeen conductive wires 18 are integrated.

Figure 3:
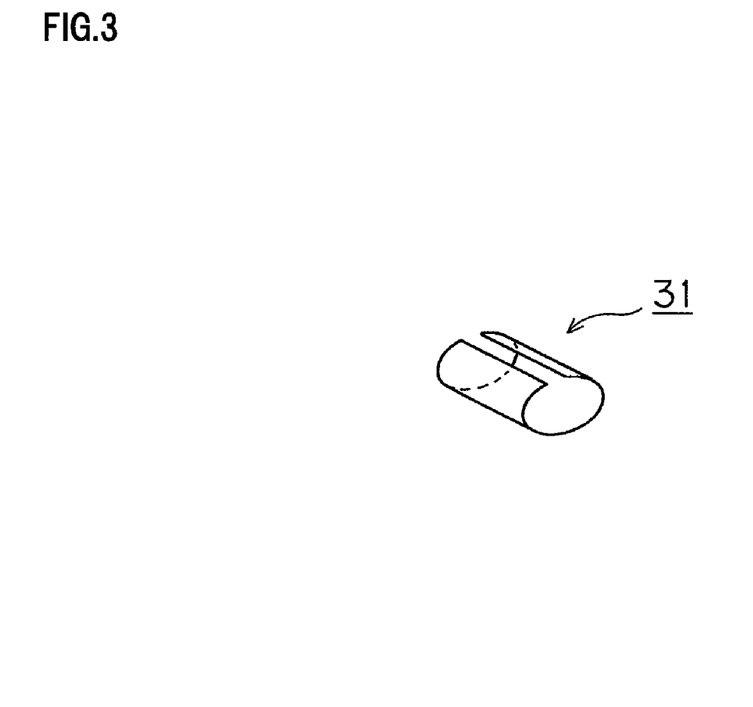
FIG. 3 is a perspective view of a cable clamp.

FIG. 3 is a perspective view of the cable clamp 31.

The cable clamp 31 is one configured such that a tube made of resin such as polyimide is incised, and containing the single conductive wire 18 therein. The cable clamp 31 is bonded to the temperature measuring substrate W with a thermoplastic heat-resistant adhesive with being in a concave part formed on the temperature measuring substrate W.

Figure 4:
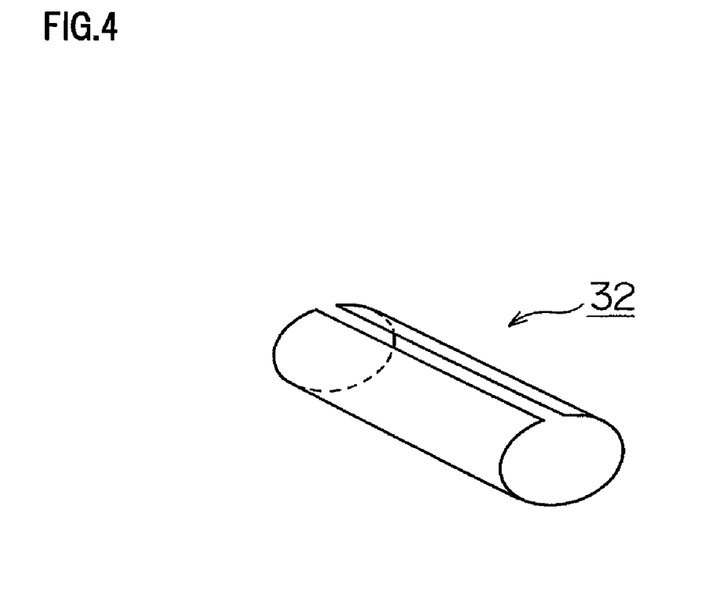
FIG. 4 is a perspective view of the cable clamp.

Note that the incision in each of the cable clamps 31 and 32 is one formed in a direction in which the tube is divided lengthwise along a longer direction of the tube. In other words, an incision cuts the tube such that a cross part of the tube forms into an alphabet "C". By using the tube with the incision made in this manner to form the cable clamp 31 or 32, the conductive wire 18 can be fixed to the temperature measuring substrate after the cable clamp 31 or 32 has been bonded to the temperature measuring substrate W.

FIG. 4 is a perspective view of the cable clamp 32.

The cable clamp 32 is also one configured such that a tube made of resin such as polyimide is incised, and integrally containing the seventeen conductive wires 18 therein. The cable clamp 32 is also bonded to the temperature measuring substrate W with the thermoplastic heat-resistant adhesive with being in a concave part formed on the temperature measuring substrate W.

Figure 5:
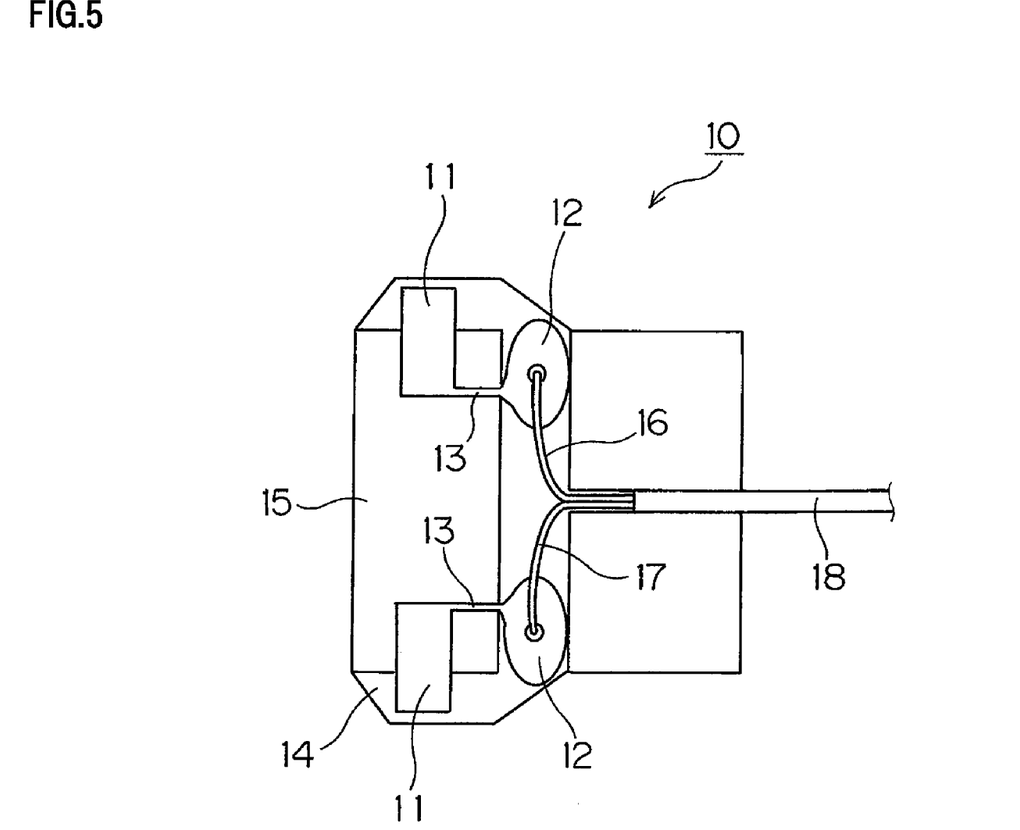
FIG. 5 is a plan view of a sensor part.
Figure 6:
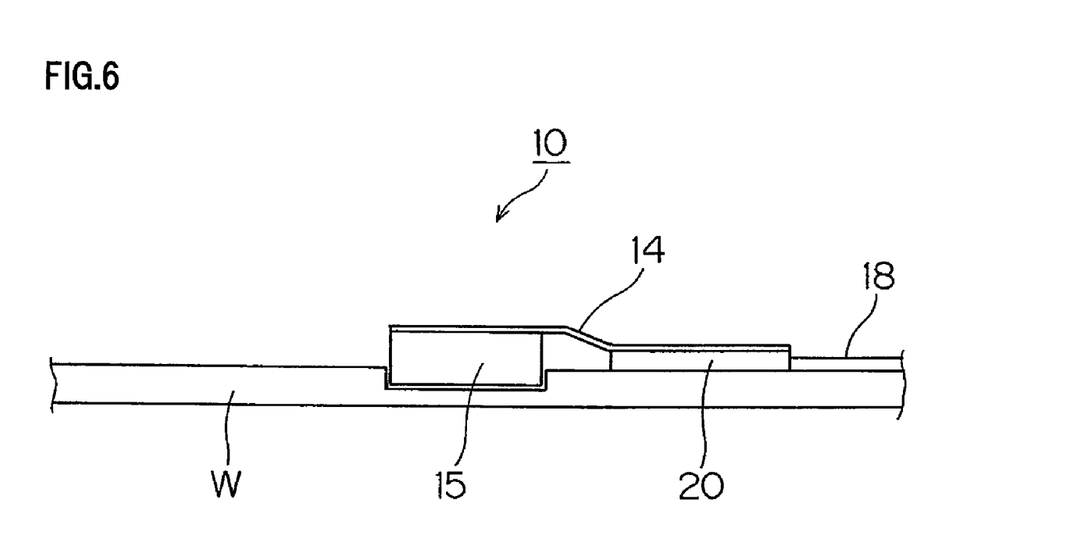
FIG. 6 is a sectional side view of the sensor part.

FIG. 5 is a plan view of the sensor part 10, and FIG. 6 a sectional side view of it.

The sensor part 10 is provided with a temperature sensor 15 that is bonded to the temperature measuring substrate W with being in a concave part formed on the temperature measuring substrate W (see FIG. 6). The temperature sensor 15 is bonded into the concave part formed on the temperature measuring substrate W with a heat-resistant ceramic-based adhesive. As the temperature sensor, one using a resonant frequency of a quarts oscillator (hereinafter referred to as a "quartz temperature sensor") is used. In the case of using the quartz temperature sensor, the sensor is unlikely to accept influence of noise, and therefore high resolution, high accuracy, and high stability can be obtained. Note that, instead of the quartz temperature sensor, for example, a temperature sensor using a temperature sensing member such as a platinum resistor or thermocouple may be used.

Also, the sensor part 10 is provided with a printed circuit board 14 made of resin, on which a pair of electrically conductive metal patterns is formed. Each of the pair of electrically conductive metal patterns includes: a first pattern part 11 connected to one of a pair of electrodes of the temperature sensor 15; a second pattern part 12 connected with one of a pair of conductive wires 16 and 17; and a connection part 13 making a connection between the first pattern part 11 and the second pattern part 12. The connection between one of the pair of electrodes of the temperature sensor 15 and the first pattern part 11 or between one of the pair of conductive wires 16 and 17 and the second pattern part 12 is made with the use of Dotite or solder.

The first and second pattern parts 11 and 12 respectively have certain areas for convenience of connections with the electrodes of the temperature sensor 15 and conductive wires 16 and 17. On the other hand, in order to increase a thermal resistance to thereby decrease heat transfer between the temperature sensor 15 and the conductive wire 16 or 17, the connection part 13 is configured to have a small area to the extent not affecting current-carrying. Note that, to set the thermal resistance to a necessary value, the area of the connection part as viewed planarly (i.e., a cross-sectional area of a current-carrying part) is preferably made one-third or less of the area of the first or second pattern part 11 or 12 (i.e., a cross-sectional area of a current-carrying part).

The printed circuit board 14 is formed of extremely thin resin such as polyimide. Also, the printed circuit board 14 is bonded to a surface of the temperature measuring substrate W with heat resistant double-sided tape or thermoplastic heat resistant adhesive 20.

The pair of conductive wires 16 and 17, of which one forms into a core wire and the other one forms into a conductive wire 18 surrounding a cover made of fluorine resin on an outer circumference of a coaxial cable that is an outer skin, are fixed to the surface of the temperature measuring substrate W with the above-described cable clamps 31 and 32.

Figure 7:
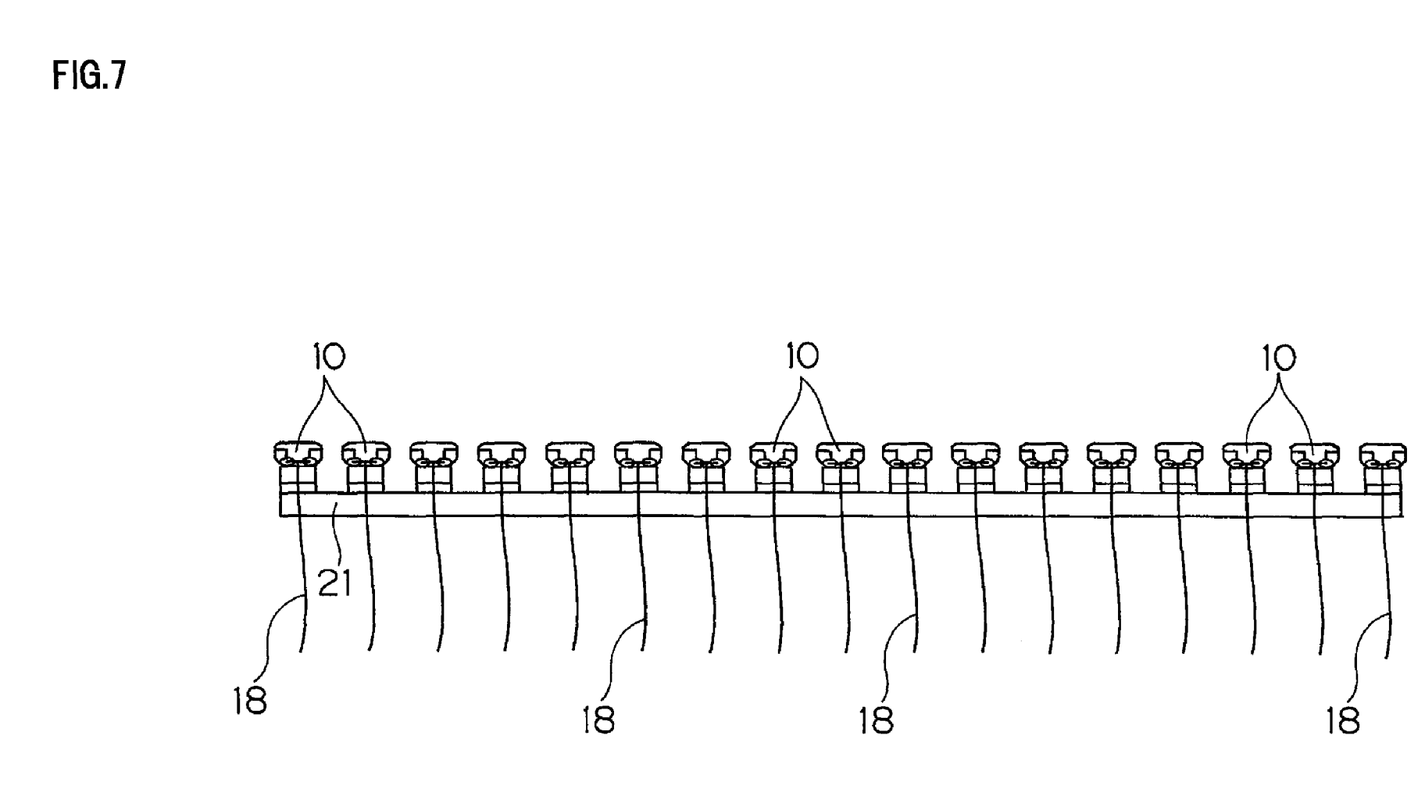
FIG. 7 is an explanatory diagram illustrating a manufacturing process of the sensor part.

FIG. 7 is an explanatory diagram illustrating a manufacturing process of the sensor part 10.

The printed circuit board 14 constituting the sensor part 10 is manufactured in a state where the seventeen sensor parts 10 are joined through a joining part 21 made of extremely thin resin such as polyimide. Also, in the state, the first and second pattern parts 11 and 12 of the printed circuit board 14 are connected with the temperature sensor 15 and the conductive wire 18.

The sensor part 10 manufactured in this manner is immersed in an oil bath, in which oil temperature-controlled to a predetermined temperature is stored, to calibrate a measured temperature. At this time, the seventeen sensor parts 10 are joined, and therefore temperature calibration work for them can be performed at once, resulting in improvement of working efficiency. Note that the temperature calibration work is described below in detail.

Subsequently, by cutting the printed circuit board 14, the temperature calibrated sensor parts 10 are divided into separate ones, which are then fixed onto the temperature measuring substrate W.

In the case of measuring with the use of the temperature measuring part 4 how a temperature of the temperature measuring substrate to be treated by the thermal treatment equipment 5 having the thermal treatment plate 51 varies, the temperature measuring substrate W is placed on the thermal treatment plate 51, and then heated by the thermal treatment plate 51. The temperature of the temperature measuring substrate W at the time is measured by the temperature sensor 15 of the sensor part 10, and a corresponding output signal is transmitted to the temperature computing part 2 through the conductive wire 18 (cable 19). The temperature computing part 2 computes the temperature on the basis of a measured value by the temperature sensor 15, and stores and displays information on it therein and on a display screen of the personal computer 3, respectively.

At this time, in the above-described temperature measuring part 4, the temperature sensor 15 and the conductive wire 18 are connected through the printed circuit board 14 formed of the extremely thin resin such as polyimide, and therefore influence of heat capacity, heat conduction, and heat radiation of the printed circuit board can be prevented to thereby perform the temperature measurement with a small error. A thickness of the printed circuit board is approximately 30 to 500 µm to increase a thermal resistance and decrease the heat capacity. Note that, more preferably, the thickness is made thin as much as possible to the extent not affecting handling strength or the like. Also, at this time, because the area of the connection part 13 is set small to the extent not affecting current-carrying, an action of the connection part 13 having a large thermal resistance enables heat transfer between the temperature sensor 15 and the conductive wire 18 to be decreased and influence of heat radiation by the conductive wire 18 to be minimized, and therefore the temperature of the temperature measuring substrate can be more accurately measured.

Also, the use of the printed circuit board 14 enables workability upon attachment of the multiple temperature sensors 15 to the temperature measuring substrate W to be improved, and the replacement of the temperature measuring substrate W or temperature sensor 15 to be facilitated. Further, the use of the flexible printed circuit board 14 formed of the extremely thin resin such as polyimide enables influence of an external stress to be prevented.

Still further, even if the multiple temperature sensors 15 are used, the use of the printed circuit board 14 enables the connections between the temperature sensors 15 and the conductive wires 18 to be made thermally uniform, and relative errors in thermal response among the temperature sensors 15 to be reduced.

Figure 8:
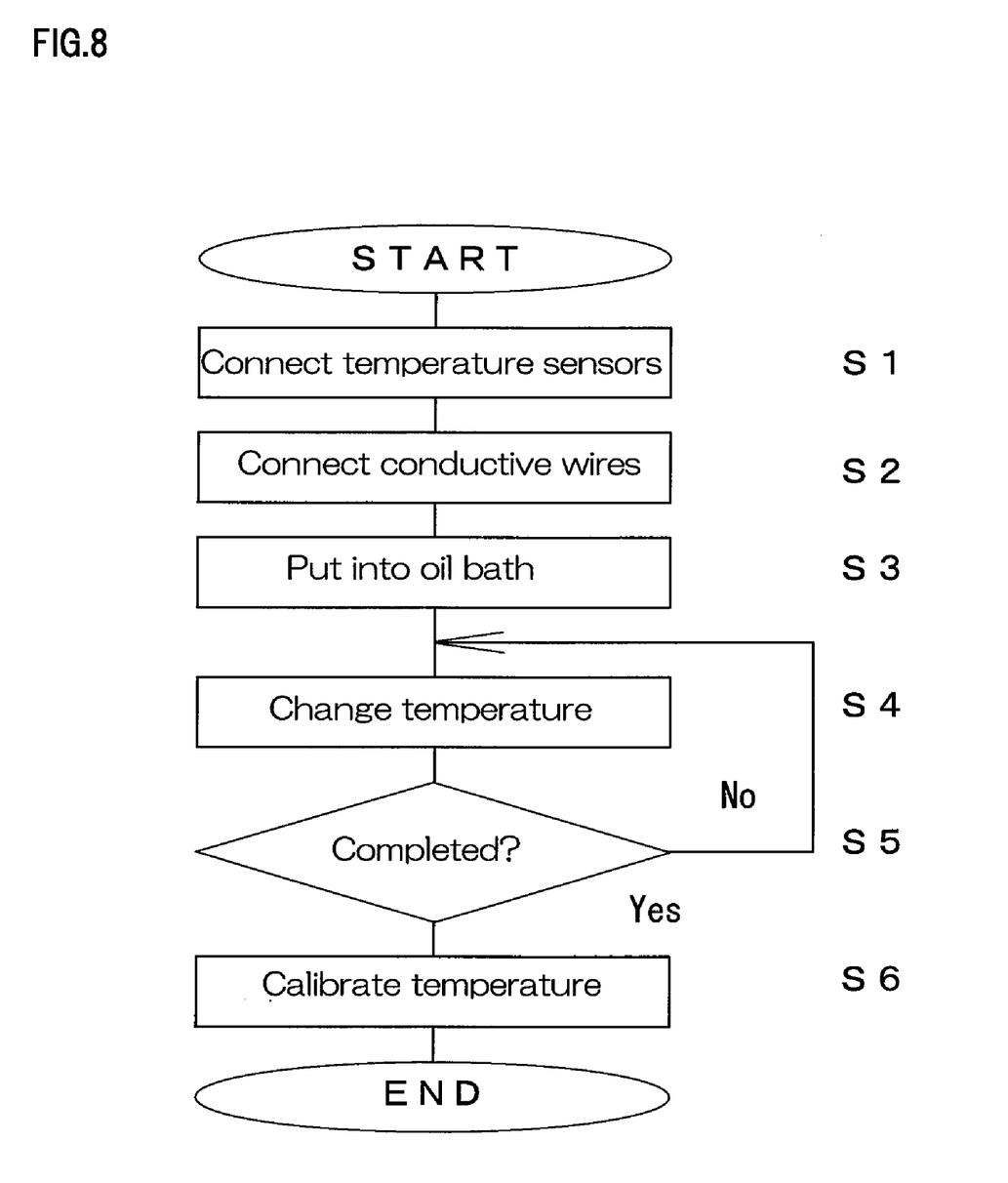
FIG. 8 is a flowchart illustrating a procedure for temperature calibration.

Next, a temperature calibration method for the sensor part 10 to calibrate a temperature of the sensor part 10 is described. FIG. 8 is a flowchart illustrating a procedure for calibrating the temperature of the sensor part 10 according to the present invention.

When the temperature of the sensor part 10 is calibrated, the temperature sensor 15 is preliminarily connected to the printed circuit board 14 (Step S1), and the pair of conductive wires 16 and 17 is connected to the printed circuit board 14 (Step S2). These steps form the seventeen sensor parts 10 connected through the joining part 21 made of the extremely thin resin such as polyimide as illustrated in FIG. 7. The seventeen sensor parts 10 are, as illustrates in FIG. 2, ones 10 to be attached to the temperature measuring substrate W in the temperature measuring part 4.

Subsequently, the seventeen sensor parts 10 are together put into a temperature-controlled oil bath (Step S3). At this time, the sensor parts 10 are put into the oil bath with being shaped small by using the flexibility of the printed circuit board 14 made of resin to bend the printed circuit board 14. Note that, in the oil bath, liquid (hereinafter simply referred to as "oil") such as Fluorinert, which is fluorine based inert fluid produced by Sumitomo 3M Ltd., or silicone oil is stored. A temperature of the oil in the oil bath is set to T1° C.

The temperature of the liquid in the oil bath is measured by a thermometer, which can be used as a reference (hereinafter simply referred to as a "reference thermometer") placed in the oil bath. The reference thermometer is precisely calibrated in advance by a standard thermometer provided in JCT21301 or the like, which is an application guideline of technical requirements for a contact thermometer in JCSS (Japan Calibration Service System).

When the reference thermometer indicates T1° C., output signals from the respective sensor parts 10 are measured and stored. More specifically, if the temperature sensors 15 are quartz thermometers, frequencies of the output signals from the respective sensor parts 10 are measured and stored. Alternatively, if the temperature sensors 15 are platinum resistors, resistance values are measured and stored from the output signals from the respective sensor parts 10. The values of the output signals at this time are determined to be output values outputted by the respective sensor parts 10 at the temperature of T1.

Subsequently, the oil temperature is changed to T2 (Step S4). At this time, the seventeen sensor parts 10 may be together put into another oil temperature-controlled to a temperature of T2 different from T1, or the temperature of the oil stored in a same oil bath may be changed from T1 to T2. Then, when the reference thermometer indicates T2° C., output signals from the respective sensor parts 10 are again measured and stored. Values of the output signals at this time are determined to be output values outputted by the respective sensor parts 10 at the temperature of T2.

The above-described operations are performed while changing the temperature multiple times, and after a required number of temperature changes have been completed (Step S5), the temperature calibration of the respective sensor parts is performed on the basis of data on each of the temperatures and output signals from the respective sensor parts at the temperature. That is, on the basis of a plurality of pieces of data indicating relationships between preliminarily inputted characteristics of the respective temperature sensors 15, and the oil temperatures and the output signals of the respective sensor parts 10 at the temperatures, data indicating a relationship between an actual temperature and output signals of the respective sensors 10 at the temperature is obtained.

Based on this, the temperature calibration of the seventeen sensor parts 10 to be attached to the temperature measuring substrate W in the temperature measuring part 4 can be efficiently performed at once. At this time, because the seventeen sensor parts 10 have not yet been attached to the temperature measuring substrate W, the oil bath used for putting the seventeen sensor parts 10 together therein is only required to have a size capable of accepting the seventeen sensor parts 10 and the printed circuit board 14, but does not require a size capable of containing the temperature measuring substrate W. In particular, the joining part 21 is made of the extremely thin resin such as polyimide and has flexibility, and therefore, by bending it with the sensor parts 10, the temperature calibration work can be performed with the use of the oil bath of a cylindrical shape having a relatively small inner diameter. In general, if the cylindrical oil bath having a relatively small inner diameter is used, a temperature of the oil stored inside it is easily kept uniform, as compared with the use of a relatively large oil bath. For this reason, the temperature calibration work can be more accurately performed. Also, the sensor parts 10 are subjected to the temperature calibration before being divided into seventeen pieces, and therefore there is no possibility of handling problem due to entanglement of the seventeen conductive wires 18, resulting in good workability.

Also, according to this temperature calibration method, the temperature calibration is performed with the temperature sensor 15 and the pair of conductive wires 16 and 17 being connected to the printed circuit board 14, and therefore the calibration can be performed in a condition close to an actual use condition including electrical characteristics such as resistance and capacitance values of the conductive wires.

In the above-described embodiment (hereinafter referred to as a "first embodiment"), the calibration work is performed under a condition that the output values of all of the seventeen sensor parts 10 for the case where the temperature of the oil in the oil bath is sequentially changed from T1, to T2, . . . are considered as the output values for the case where the temperature of the sensor parts 10 is T1, T2, . . . . However, in general, due to a difference in response speed between the reference thermometer in the oil bath and the temperature sensor 15 to be calibrated, even if a predetermined temperature is reached on a reference thermometer, all of the seventeen sensor parts 10 may not reach a same temperature. In particular, if the response speed of the reference thermometer is slower than that of the sensor part 10, a calibration error tends to increase.

Figure 9:
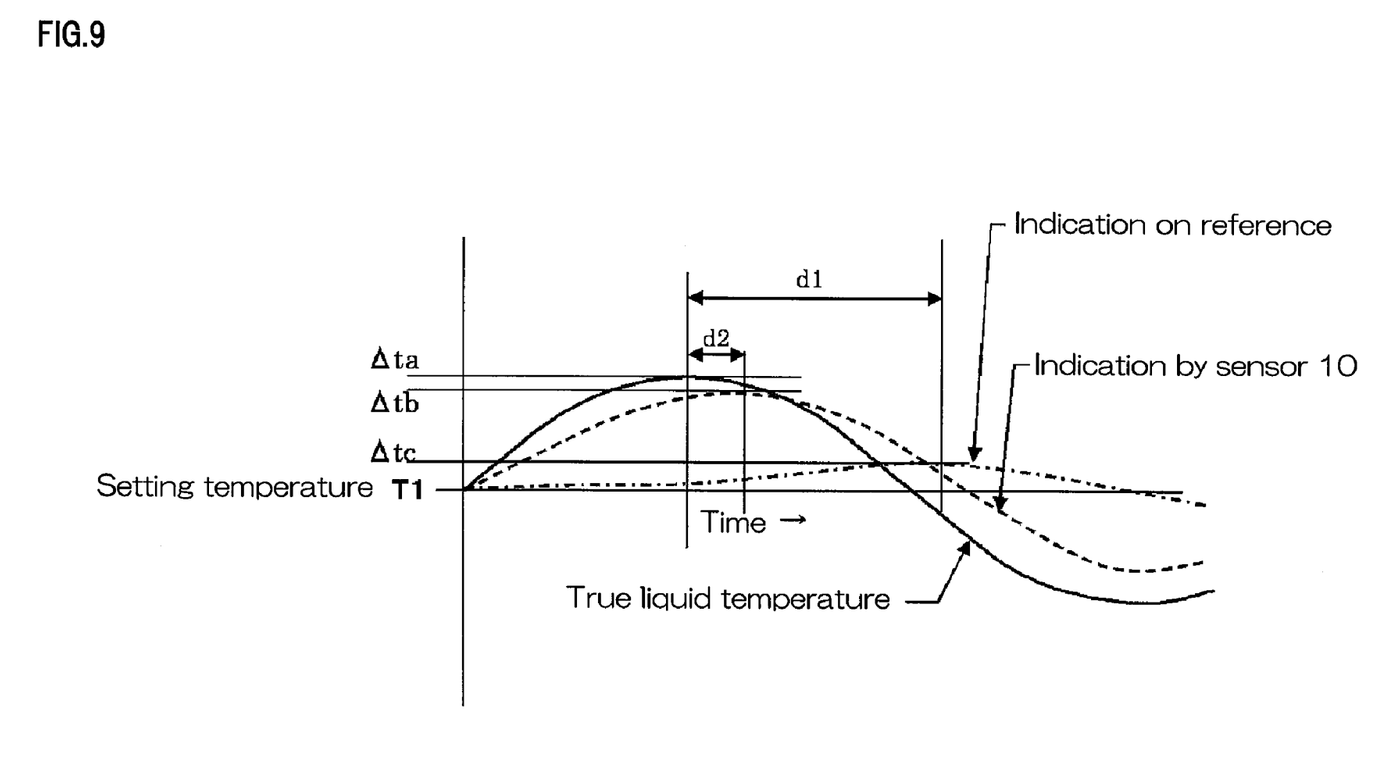
FIG. 9 is a diagram schematically illustrating temperature variations of items involved in calibration.

FIG. 9 is a diagram schematically illustrating temperature variations of the items involved in the calibration, for explaining such tendency. If the liquid temperature in the boil bath varies as a "true liquid temperature" in FIG. 9 with a setting temperature being T1, a delay of d1 appears until the reference thermometer having a slower response speed indicates a peak temperature of (T1+Δtc). On the other hand, the sensor part 10 has a relatively fast response speed, and therefore a delay until a peak temperature is reached is only d2. Accordingly, even once the setting temperature T1 is reached on the reference thermometer, a temperature of the sensor part 10 has already varied with following the true liquid temperature, and therefore depending on calibration timing, a maximum error Δtb occurs.

In the diagram, measured values of the plurality of sensor parts 10 are illustrated as the one graph; however, if the reference thermometer having different response speed is used, the seventeen sensor parts may respectively have differences in temperature, depending on a position of the sensor in the oil bath. Even if the seventeen sensor parts 10 are together calibrated at the same time, as long as the reference temperature having different response speed is used as a reference, relative errors among the seventeen sensors are likely to occur.

Therefore, a second embodiment of the present invention capable of performing accurate calibration even in such a case is described.

That is, in the second embodiment, only one of the sensor parts 10 (hereinafter referred to as a "specific sensor part 10") is first subjected to the above-described calibration, and the other sixteen sensor parts 10 are calibrated on the basis of the previously calibrated specific sensor part 10. This allows the calibration to be performed on the basis of a temperature measured by the sensor part 10 having the same response speed, and therefore more accurate calibration with less influence of the response speed of the sensor part 10 can be performed.

Detailed description of the second embodiment is as follows.

The temperature sensor 15 is preliminarily connected to the printed circuit board 14, and the pair of conductive wires 16 and 17 is connected to the printed circuit board 14. The seventeen sensor parts 10 are together put into the temperature-controlled oil bath. These steps up to here are the same as those in the first embodiment.

Subsequently, when the reference thermometer indicates T1° C., any one of the seventeen sensor parts is selected and defined as the specific sensor part 10, and an output signal of the specific sensor part is measured and stored. Note that as the specific sensor part 10, any of the seventeen sensor parts may be selected, and even if any one is selected, a difference in a calibration accuracy does not appear.

Then, the oil temperature is changed to T2. At this time, the specific sensor part 10 may be put into another oil bath temperature-controlled to a temperature of T2 different from T1° C., or the temperature of the oil stored in the same oil bath may be changed from T1 to T2. When the reference thermometer indicates T2° C., an output signal from the specific sensor part 10 is measured and stored. A value of the output signal at this time is determined to be an output value outputted by the specific sensor part 10 at the temperature of T2.

The above-described operations are performed while changing the temperature multiple times, and after a required number of temperature changes have been completed, temperature calibration of the specific sensor part 10 is performed on the basis of data on each of the temperatures and an output signal from the specific sensor part 10 at the temperature. That is, on the basis of a plurality of pieces of data indicating relationships between a preliminarily inputted characteristic of the temperature sensor 15 in the specific sensor part 10, and the oil temperatures and the output signals of the specific sensor parts 10 at the temperatures, data indicating a relationship between an actual temperature and output signals of the respective sensor parts 10 at the temperature is obtained.

Subsequently, the other sixteen sensor parts 10 are calibrated on the basis of the previously calibrated specific sensor part 10. That is, simultaneously with measuring the output signal of the specific sensor part 10 in the oil bath, the output signals of the other sixteen sensor parts 10 are measured, and the output signals of all of the seventeen sensor parts 10 are stored. Based on this operation, data on a correlation of the output value of each of the other sixteen sensor parts 10 to that of the specific sensor part 10 at the same temperature as that of the specific sensor part 10 can be grasped. Note that the output value of the sensor part 10 does not necessarily have a relationship linearly proportional to temperature, and therefore the above-described correlation data is preferably measured at multiple temperatures. However, the temperatures do not need to include the above-described T1° C. or T2° C. because it is only necessary to grasp the data on the correlation of each of the other sixteen sensor parts 10 to the specific sensor part 10.

The above-described correlation data obtained by the above-described operation is used to calibrate the other sixteen sensor parts 10 on the basis of the previously calibrated specific sensor part 10. Based on this, the temperature calibration of the seventeen sensor parts 10 to be attached to the temperature measuring substrate W in the temperature measuring part 4 can be accurately performed.

In the second embodiment, the specific sensor part 10 is calibrated in advance, and the other sixteen sensor parts 10 are calibrated on the basis of the previously calibrated specific sensor part 10; however, because the other sixteen sensor parts 10 do not use the reference thermometer, Δtb can be kept small, and also because the response speed of the basing thermometer is the same as those of the thermometers to be calibrated, the calibration having small relative errors among the seventeen sensors can be achieved.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Applications No. 2007-277052 filed in the Japanese Patent Office on Oct. 25, 2007 and No. 2008-258337 filed in the Japanese Patent Office on Oct. 3, 2008, the entire disclosure of which is incorporated herein by reference.

What is claimed is:

1. A temperature computing instrument for measuring performance of substrate treatment equipment, the temperature computing instrument comprising:
   a temperature measuring substrate to be placed in a treatment part of the substrate treatment equipment;
   a temperature sensor fixed to the substrate;
   a printed circuit board made of resin, the printed circuit board being formed with a pair of electrically conductive metal patterns connected to an electrode of the temperature sensor;
   a pair of conductive wires connected to the pair of electrically conductive metal patterns; and
   a temperature computing part connected to the pair of conductive wires.

2. The temperature computing instrument according to claim 1, wherein
   the pair of electrically conductive metal patterns comprise:
   a first pattern part connected to a pair of electrodes of the temperature sensor;
   a second pattern part connected to the pair of conductive wires; and
   a connection part making a connection between the first pattern part and the second pattern part, the connection part having a large thermal resistance.

3. The temperature computing instrument according to claim 2, wherein
   the printed circuit board made of resin is extremely thin and bendable.

4. The temperature computing instrument according to claim 2, comprising
   a tubular fixing member bonded to the substrate, the tubular fixing member containing the conductive wire therein.

5. A temperature calibration method for calibrating a temperature sensor used for a temperature computing instrument for measuring performance of substrate treatment equipment, the method comprising:
   a connection step of connecting all temperature sensors to be fixed to a temperature measuring substrate to be placed in a treatment part of the substrate treatment equipment and pairs of conductive wires corresponding to the temperature sensors to a printed circuit board made of resin, the printed circuit board being formed with an electrically conductive metal pattern;
   a measurement step of immersing the printed circuit board along with the temperature sensors and the conductive wires in temperature-controlled liquid to measure output signals of the temperature sensors, the temperature sensors and the conductive wires being connected to the printed circuit board, the measurement step being performed multiple times with a temperature of the liquid being changed; and
   a calibration step of, on a basis of the temperature of the liquid in the measurement step and the output signals of the temperature sensors at the temperature, performing temperature calibration of the sensors.

6. The temperature calibration method according to claim 5, wherein
   the printed circuit board made of resin is extremely thin and bendable, and
   in the measurement step, the plurality of temperature sensors are put into an oil bath with being shaped small by bending the printed circuit board.

7. The temperature calibration method according to claim 5, wherein the measurement step comprising steps of:
   measuring an output signal of one of the plurality of temperature sensors immersed in the temperature-controlled liquid; and
   comparing an output value of the one sensor immersed in the liquid with each of output values of the other temperature sensors to grasp data on a correlation of each of the output values of the other temperature sensors to the output value of the one sensor upon immersion of the one sensor and the other temperature sensors in the liquid having a constant temperature, and in the calibration step, the one temperature sensor is subjected to temperature calibration on a basis of a temperature of the liquid in the measurement step and the output signal of the temperature sensor at the temperature, and the other temperature sensors are subjected to calibration with use of the correlation data on a basis of the one temperature sensor.

\* \* \* \* \*